(12) United States Patent
Palmer

(10) Patent No.: US 10,212,924 B1
(45) Date of Patent: Feb. 26, 2019

(54) TOPSIDE TROLLING REEL

(71) Applicant: Mike Palmer, Williston, ND (US)

(72) Inventor: Mike Palmer, Williston, ND (US)

( * ) Notice: Subject to any disclaimer, the term of this patent is extended or adjusted under 35 U.S.C. 154(b) by 201 days.

(21) Appl. No.: 15/408,496

(22) Filed: Jan. 18, 2017

(51) Int. Cl.
*A01K 89/01* (2006.01)
*A01K 89/015* (2006.01)
*A01K 87/06* (2006.01)
*A01K 89/0165* (2006.01)
*A01K 89/0155* (2006.01)

(52) U.S. Cl.
CPC ........ *A01K 89/01925* (2015.05); *A01K 87/06* (2013.01); *A01K 89/0165* (2013.01); *A01K 89/01556* (2015.05)

(58) Field of Classification Search
CPC .............. A01K 89/01127; A01K 89/01; A01K 89/015; A01K 89/0165; A01K 89/0192; A01K 89/01925
See application file for complete search history.

(56) References Cited

U.S. PATENT DOCUMENTS

| 3,004,731 A | 10/1961 | Mauborgne |
| 3,053,469 A | 12/1965 | King |
| 3,319,903 A * | 5/1967 | Mosier ............. A01K 89/01556 242/287 |
| 3,966,138 A | 6/1976 | Gelardi |
| 6,397,511 B1 | 6/2002 | Atnip |
| 7,784,214 B2 | 8/2010 | Mullane |
| 2002/0060258 A1* | 5/2002 | Ikuta .................. A01K 89/0192 242/310 |
| 2005/0211812 A1* | 9/2005 | Nakagawa ............. A01K 89/00 242/223 |
| 2012/0255215 A1* | 10/2012 | Cooper .................. A01K 87/06 43/20 |
| 2014/0101983 A1 | 4/2014 | Scott |
| 2015/0327526 A1* | 11/2015 | Cooper .................. A01K 87/06 43/21.2 |

FOREIGN PATENT DOCUMENTS

WO 2013015772 A1 1/2013

* cited by examiner

*Primary Examiner* — Emmanuel M Marcelo

(57) ABSTRACT

The topside trolling reel is an adapter that attaches a trolling reel to the bottom side of a spin casting reel. The trolling reel is further defined with a cage, a spool, a tensioner, a handle, and a trolling reel foot. The cage is further defined with a first end disk, a second end disk, and a plurality of cage bars. The topside trolling reel comprises a trolling reel and a spinning rod adapter. The spinning rod adapter attaches the cage of the trolling reel to the traditional bottom mount of a spin casting reel rod. In the first potential embodiment of the disclosure, the spinning rod adapter is attached to the cage of the trolling reel using four readily and commercially available screws. The spinning rod adapter is then attached normally to a reel seat provisioned spin casting reel rod.

9 Claims, 5 Drawing Sheets

TOPSIDE TROLLING REEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of agricultural and animal husbandry, more specifically, a trolling reel configured for use in angling.

A trolling reel is a device used in angling. The trolling reel is also commonly referred to as a level wind reel, a bait casting reel, a line counter reel, a two speed level reel, a casting reel, and a lever drag reel. A common alternative to the selection of a trolling reel is a spin casting reel. The primary differences between the trolling reel and the spin casting reel is: 1) a trolling reel is superior in laying out and managing a fishing line when trolling for fish; however, 2) a spin casting reel is superior in catching large and strong fish. The reason that the spin casting reel is superior with large and strong fish is that the spin casting reel is more stable than a trolling reel. Specifically, the trolling reel tends to twist in response to the strong pressures generated by fish trying to evade capture. This is because of the traditional top mounting of the trolling reel. The reason for this twist is that a fish that applies pressure on the fishing rod will cause the fishing rod to curve such that the bottom side of the fishing rod will form a concave surface. When the fishing rod is arranged such the fishing line runs along the top of the fishing rod (a common arrangement for trolling reels), when the fishing rod bends, the amount of fishing line paid out through the guides will be less than the circumference formed by the fishing rod. This causes the fishing line to put pressure against the fishing guides which will cause the fishing rod to move in a random and unstable manner. By running the fishing line along the bottom of the fishing rod, the amount of fishing line paid out through the guides will be greater than the circumference formed by the fishing rod thereby avoiding this problem.

Clearly a device that eliminates this source of instability for a trolling reel would be of benefit for the angling community.

SUMMARY OF INVENTION

The topside trolling reel is an adapter that attaches a trolling reel to the bottom side of a spin casting reel. The trolling reel is further defined with a cage, a spool, a tensioner, a handle, and a trolling reel foot. The cage is further defined with a first end disk, a second end disk, and a plurality of cage bars. The topside trolling reel comprises a trolling reel and a spinning rod adapter. The spinning rod adapter attaches the cage of the trolling reel to the traditional bottom mount of a spin casting reel rod. In the first potential embodiment of the disclosure, the spinning rod adapter is attached to the cage of the trolling reel using four readily and commercially available screws. The spinning rod adapter is then attached normally to a reel seat provisioned with the spin casting reel rod.

These together with additional objects, features and advantages of the topside trolling reel will be readily apparent to those of ordinary skill in the art upon reading the following detailed description of the presently preferred, but nonetheless illustrative, embodiments when taken in conjunction with the accompanying drawings.

In this respect, before explaining the current embodiments of the topside trolling reel in detail, it is to be understood that the topside trolling reel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the topside trolling reel.

It is therefore important that the claims be regarded as including such equivalent construction insofar as they do not depart from the spirit and scope of the topside trolling reel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
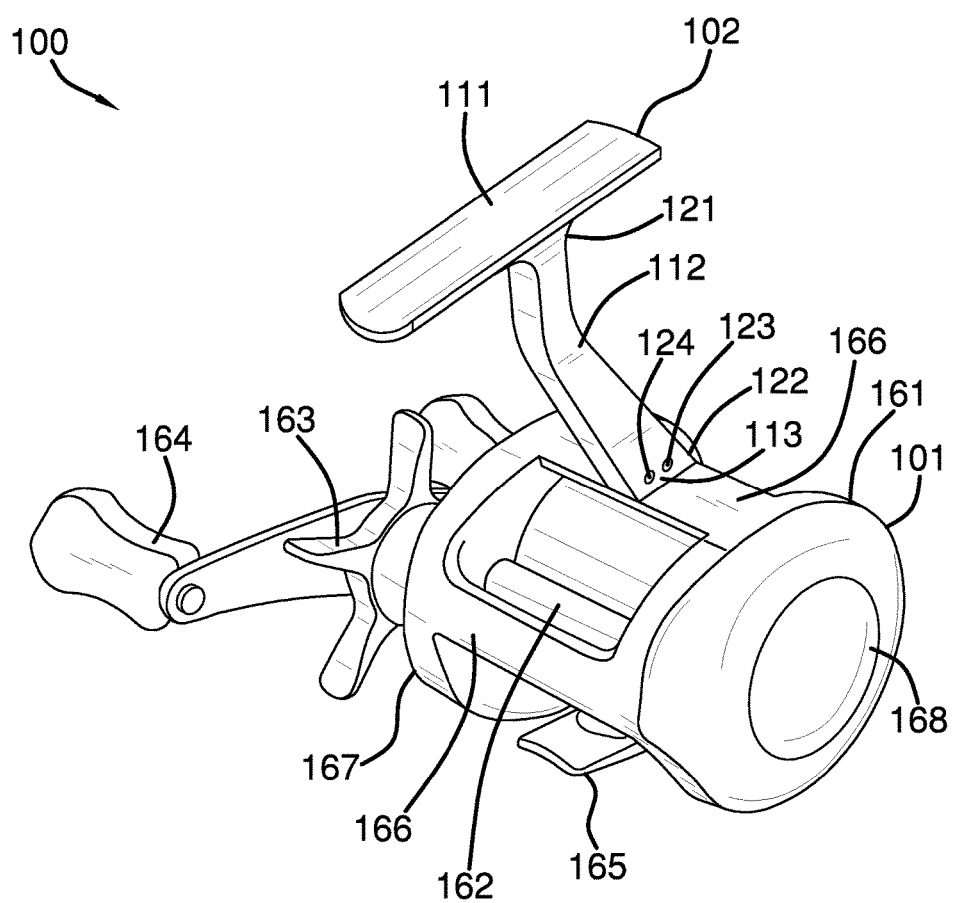
FIG. 1 is a perspective view of an embodiment of the disclosure.
Figure 2:
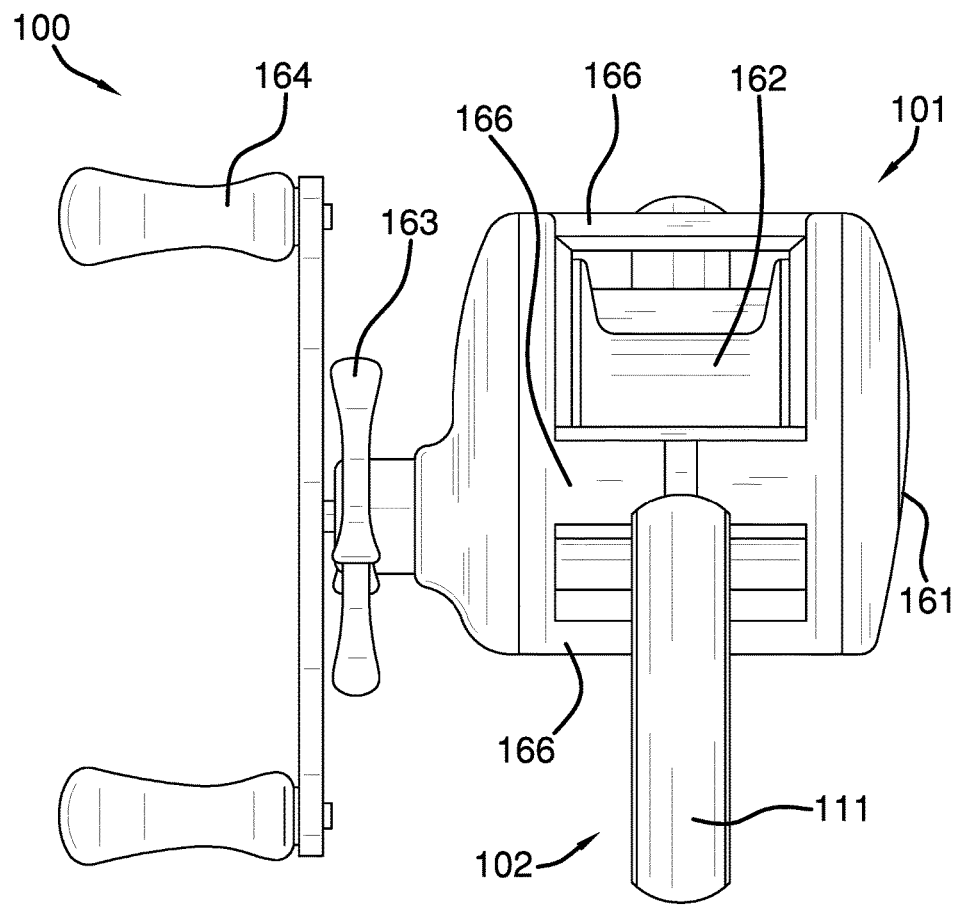
FIG. 2 is a top view of an embodiment of the disclosure.
Figure 3:
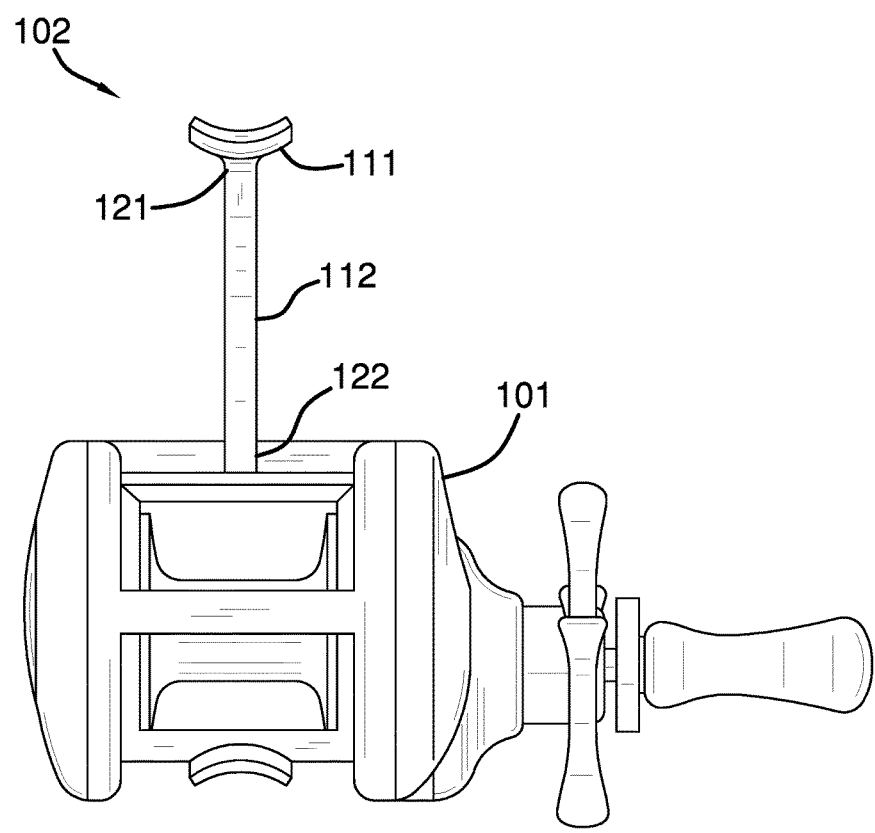
FIG. 3 is a back view of an embodiment of the disclosure.
Figure 4:
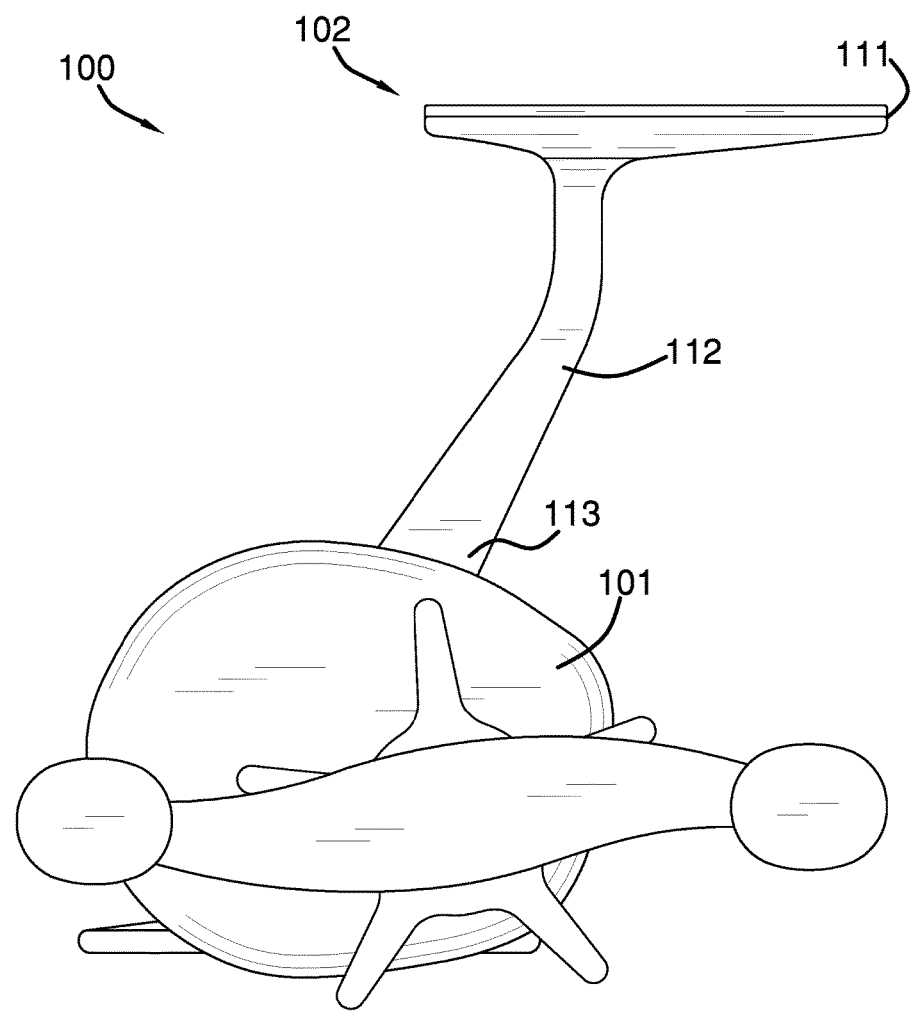
FIG. 4 is a side view of an embodiment of the disclosure.
Figure 5:
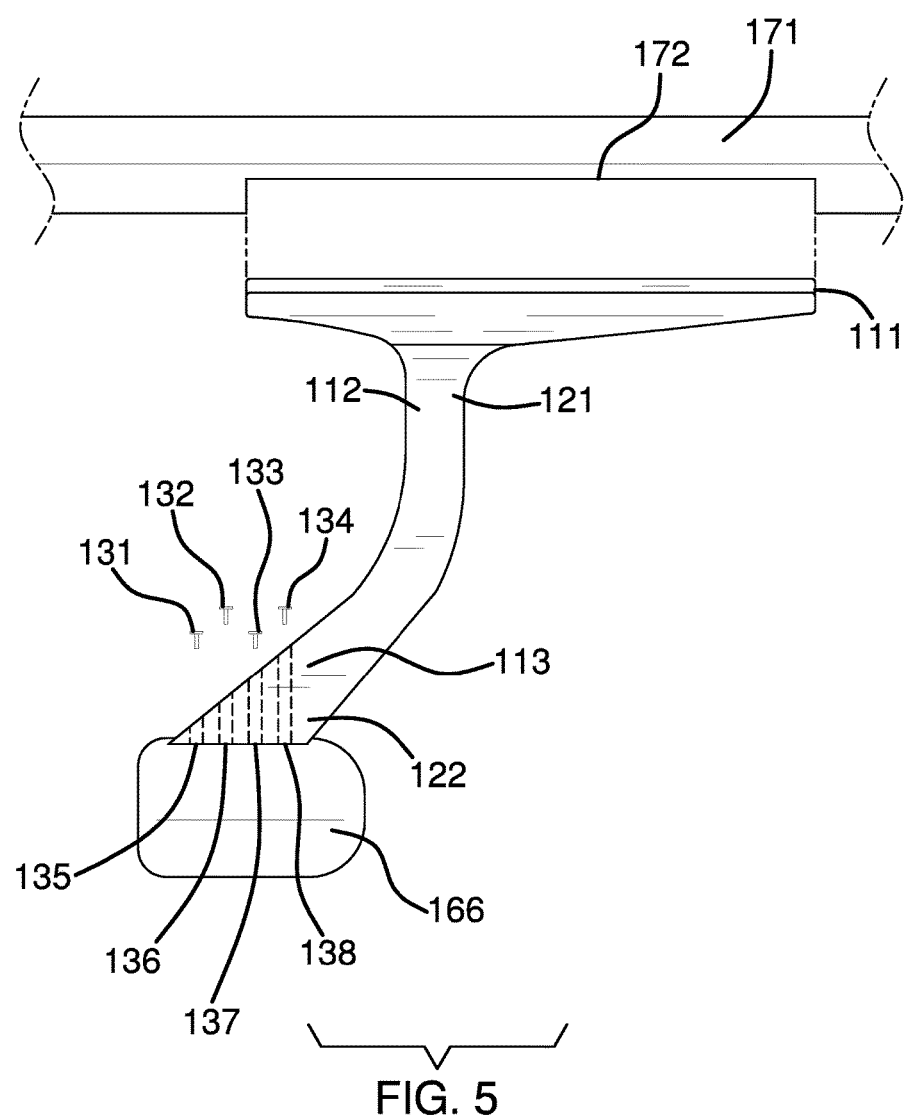
FIG. 5 is an exploded view of an embodiment of the disclosure.

Detailed reference will now be made to one or more potential embodiments of the disclosure, which are illustrated in FIGS. 1 through 5.

The topside trolling reel 100 (hereinafter invention) is an adapter that attaches a trolling reel 101 to the bottom side of a spin casting reel rod 171. The spin casting reel rod 171 is further defined with a reel seat 172. The reel seat 172 is a standardized connection that attaches a spin casting reel to a spin casting reel rod 171. The invention 100 comprises a trolling reel 101 and a spinning rod adapter 102. The spinning rod adapter 102 attaches to the cage 161 of the trolling reel 101 to the traditional bottom mount of a spin casting reel rod 171. In the first potential embodiment of the disclosure, the spinning rod adapter 102 is attached to the cage 161 of the trolling reel 101 using four readily and commercially available screws. The spinning rod adapter 102 is then attached normally to a reel seat 172 provisioned with the spin casting reel rod 171.

The trolling reel 101 is a readily and commercially available trolling reel that is modified as described within the disclosure. It is preferred that the selected trolling reel 101 be configured for either right hand or left hand operation. The trolling reel 101 is further defined with a cage 161, a spool 162, a tensioner 163, a hand crank 164, and a trolling reel foot 165. The cage 161 is a cylindrical structure that is used: 1) to contain the spool 162; and, 2) to house the mechanism of the tensioner 163 and the mechanism of the hand crank 164. The spool 162 is a rotating cylindrical structure formed within the cage 161 upon which a length of fishing line is wound. The rotation of the spool 162 pays out and retracts the fishing line. The tensioner 163 is a mechanical device that is used to adjust the tension applied by the trolling reel 101 to the fishing line when the fishing line is paid out. The hand crank 164 is a mechanical device that is used to retract the fishing line back on the spool 162 of the trolling reel 101. The trolling reel foot 165 is a structure that is used to mount the trolling reel 101 on to a fishing rod in the traditional way. The cage 161 is further defined with a third end 167, a fourth end 168, and a plurality of cage bars 166. The plurality of cage bars 166 comprises a plurality of bars each of which are used to attach the third end 167 of the cage 161 to the fourth end 168 of the cage 161. The plurality of cage bars 166 effectively forms the face of the cylinder of the cage 161 that encloses the spool 162. The third end 167 of the cage 161 is a disk shaped structure that forms one of the two ends of the cylindrical structure that forms the cage 161. The fourth end 168 of the cage 161 is a disk shaped structure that forms one of the two ends of the cylindrical structure that forms the cage 161. A reel screw is a commercially available screw that is used to attach a spin casting reel to the reel seat 172 of a spin casting reel rod 171. The use of reel screws is well known and documented in the angling arts.

The spinning rod adapter 102 is a structure that physically attaches the trolling reel 101 to the spin casting reel rod 171. The spinning rod adapter 102 is designed such that the operational orientation of the trolling reel 101 relative to the angler is unchanged from the normal operational orientation when the spinning rod adapter 102 is used to attach the trolling reel 101 to the spin casting reel rod 171. By operational orientation is meant that the direction of rotation of the hand crank 164 and the tensioner 163 of the trolling reel 101 is the same whether the when the trolling reel 101 is mounted on the spin casting reel rod 171 with the invention 100 or the trolling reel 101 is mounted on a fishing rod using the trolling reel foot 165. The spinning rod adapter 102 comprises a spinning reel foot 111, a stave 112, and a pedestal 113. The stave 112 is further defined with a first end 121 and a second end 122.

The spinning reel foot 111 is the structure of the spinning rod adapter 102 that physically attaches the spinning rod adapter 102 to the reel seat 172 of the spin casting reel rod 171. The form factor of the spinning reel foot 111 conforms to an industry standard shape that is commonly used when attaching a spin casting reel to the reel seat 172 of the spin casting reel rod 171.

The pedestal 113 is a structure that is used to anchor the spinning rod adapter 102 to the trolling reel 101. The pedestal 113 further comprises a plurality of self-tapping screws 123 and a plurality of screw holes 124. The plurality of self-tapping screws 123 is a collection of commercially and readily available self-tapping screws that are used to screw the pedestal 113 into a cage bar selected from the plurality of cage bars 166 of the cage 161. The plurality of screw holes 124 is a collection of apertures formed within the pedestal 113 that are sized to receive the plurality of self-tapping screws 123 during the attachment of the pedestal 113 to the trolling reel 101.

The stave 112 is a joining member that attaches the spinning reel foot 111 to the pedestal 113. The stave 112 provides the separation between the trolling reel 101 and the spin casting reel rod 171 that is required for the proper operation of the trolling reel 101. The spinning reel foot 111 attaches to the first end 121 of the stave 112. The pedestal 113 attaches to the second end 122 of the stave 112.

Each of the plurality of self-tapping screws 123 attach the pedestal 113 to a cage bar selected from the plurality of cage bars 166 of the cage 161 of the trolling reel 101. Each of the plurality of self-tapping screws 123 is fitted through a screw hole selected from the plurality of screw holes 124 in order to attach the pedestal 113 to the trolling reel 101.

The plurality of self-tapping screws 123 comprises a first self-tapping screw 131, a second self-tapping screw 132, a third self-tapping screw 133, and a fourth self-tapping screw 134. The plurality of screw holes 124 comprises a first screw hole 135, a second screw hole 136, a third screw hole 137, and a fourth screw hole 138. The first self-tapping screw 131 is inserted through the first screw hole 135 in order to attach the pedestal 113 to the plurality of cage bars 166. The second self-tapping screw 132 is fitted through the second screw hole 136 in order to attach the pedestal 113 to the plurality of cage bars 166. The third self-tapping screw 133 is fitted through the third screw hole 137 in order to attach the pedestal 113 to the plurality of cage bars 166. The fourth self-tapping screw 134 is fitted the fourth screw hole 138 in order to attach the pedestal 113 to the plurality of cage bars 166.

The spinning reel foot 111 slides into the reel seat 172 of the spin casting reel rod 171. The spinning reel foot 111 is held in position using the reel screw. The use of a reel screw to attach the spinning reel foot 111 into the reel seat 172 of a spin casting reel rod 171 is well known and documented in the angling arts.

The following definitions were used in this disclosure:

Anchor: As used in this disclosure, anchor means to hold an object firmly or securely.

Cord: As used in this disclosure, a cord is a long, thin, and flexible piece of string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, and rope are synonyms for cord.

Crank: As used in this disclosure, a crank is a handle or an arm that is attached perpendicularly to the axis of rotation of a shaft and that is used for transmitting rotary motion to the shaft.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Form Factor: As used in this disclosure, the term form factor refers to the size and shape of an object.

Spool: As used in this disclosure, a spool is a cylindrical device upon which a flexible material, including but not limited to a yarn, a cord, or a tape, can be wound. Depending on context, a spool may also contain the flexible material stored upon the spool.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An apparatus configured for use in angling comprising a trolling reel and a spinning rod adapter;
   wherein the spinning rod adapter is a structure that physically attaches the trolling reel to a spin casting reel rod;
   wherein the spin casting reel rod is further defined with a reel seat;
   wherein the trolling reel is further defined with a cage, a spool, a tensioner, a hand crank, and a trolling reel foot;
   wherein the cage is further defined with a third end, a fourth end, and a plurality of cage bars;
   wherein the spinning rod adapter attaches the cage of the trolling reel to the reel seat of the spin casting reel rod;
   wherein the spinning rod adapter is designed such that the operational orientation of the trolling reel relative to the angler is unchanged from the normal operational orientation when the spinning rod adapter is used to attach the trolling reel to the spin casting reel rod;
   wherein the spinning rod adapter comprises a spinning reel foot, a stave, and a pedestal;
   wherein the stave connects the spinning reel foot to the pedestal;
   wherein the stave is further defined with a first end and a second end;
   wherein the spinning reel foot is the structure of the spinning rod adapter that physically attaches the spinning rod adapter to the reel seat of the spin casting reel rod;
   wherein the pedestal is a structure that is used to anchor the spinning rod adapter to the trolling reel;
   wherein the pedestal further comprises a plurality of self-tapping screws and a plurality of screw holes;
   wherein the plurality of self-tapping screws are inserted and the plurality of screw holes attach the spinning rod adapter to the trolling reel;
   wherein the plurality of self-tapping screws is a collection of self-tapping screws that screw the pedestal into a cage bar selected from the plurality of cage bars of the cage.

2. The apparatus configured for use in angling according to claim 1 wherein the plurality of screw holes is a collection of apertures formed within the pedestal that are sized to receive the plurality of self-tapping screws.

3. The apparatus configured for use in angling according to claim 2 wherein the stave creates a separation between the trolling reel and the spin casting reel rod that is required for the proper operation of the trolling reel.

4. The apparatus configured for use in angling according to claim 3
   wherein the spinning reel foot attaches to the first end of the stave;
   wherein the pedestal attaches to the second end of the stave.

5. The apparatus configured for use in angling according to claim 4
   wherein each of the plurality of self-tapping screws attach the pedestal to the cage bar selected from the plurality of cage bars of the cage of the trolling reel;
   wherein each of the plurality of self-tapping screws is fitted through a screw hole selected from the plurality of screw holes in order to attach the pedestal to the trolling reel.

6. The apparatus configured for use in angling according to claim 5
   wherein the plurality of self-tapping screws comprises a first self-tapping screw, a second self-tapping screw, a third self-tapping screw, and a fourth self-tapping screw;
   wherein the plurality of screw holes comprises a first screw hole, a second screw hole, a third screw hole, and a fourth screw hole;
   wherein the first self-tapping screw is inserted through the first screw hole in order to attach the pedestal to the plurality of cage bars;
   wherein the second self-tapping screw is fitted through the second screw hole in order to attach the pedestal to the plurality of cage bars;
   wherein the third self-tapping screw is fitted through the third screw hole in order to attach the pedestal to the plurality of cage bars;
   wherein the fourth self-tapping screw is fitted the fourth screw hole in order to attach the pedestal to the plurality of cage bars.

7. The apparatus configured for use in angling according to claim 6
   wherein the spinning reel foot slides into the reel seat of the spin casting reel rod;
   wherein the spinning reel foot is held in position using a reel screw.

8. An apparatus configured for use in angling comprising a trolling reel and a spinning rod adapter;

wherein the spinning rod adapter is a structure that physically attaches the trolling reel to a spin casting reel rod;
wherein the spin casting reel rod is further defined with a reel seat;
wherein the spinning rod adapter comprises a spinning reel foot, a stave, and a pedestal;
wherein the stave connects the spinning reel foot to the pedestal;
wherein the stave is further defined with a first end and a second end;
wherein the spinning reel foot is the structure of the spinning rod adapter that physically attaches the spinning rod adapter to the reel seat of the spin casting reel rod;
wherein the pedestal is a structure that is used to anchor the spinning rod adapter to the trolling reel;
wherein the stave creates a separation between the trolling reel and the spin casting reel rod that is required for the proper operation of the trolling reel;
wherein the pedestal further comprises a plurality of self-tapping screws and a plurality of screw holes;
wherein the plurality of self-tapping screws comprises a first self-tapping screw, a second self-tapping screw, a third self-tapping screw, and a fourth self-tapping screw;
wherein the plurality of screw holes comprises a first screw hole, a second screw hole, a third screw hole, and a fourth screw hole;
wherein the first self-tapping screw is inserted through the first screw hole in order to attach the pedestal to the trolling reel;
wherein the second self-tapping screw is fitted through the second screw hole in order to attach the pedestal to the trolling reel;
wherein the third self-tapping screw is fitted through the third screw hole in order to attach the pedestal to the trolling reel;
wherein the fourth self-tapping screw is fitted the fourth screw hole in order to attach the pedestal to the trolling reel;
wherein the spinning reel foot slides into the reel seat;
wherein the trolling reel is further defined with a cage, a spool, a tensioner, a hand crank, and a trolling reel foot;
wherein the cage is further defined with a third end, a fourth end, and a plurality of cage bars;
wherein the spinning rod adapter attaches the cage of the trolling reel to the reel seat of the spin casting reel rod;
wherein the plurality of self-tapping screws are screwed into a cage bar selected from the plurality of cage bars.

9. The apparatus configured for use in angling according to claim 8 wherein the spinning rod adapter is designed such that the operational orientation of the trolling reel relative to the angler is unchanged from the normal operational orientation when the spinning rod adapter is used to attach the trolling reel to the spin casting reel rod.

* * * * *